(12) United States Patent
Grossmann

(10) Patent No.: US 7,743,689 B2
(45) Date of Patent: Jun. 29, 2010

(54) TURNING CENTER

(75) Inventor: Walter Grossmann, Baltmannsweiler (DE)

(73) Assignee: Index-Werke GmbH & Co. KG Hahn & Tessky (DE)

( * ) Notice: Subject to any disclaimer, the term of this patent is extended or adjusted under 35 U.S.C. 154(b) by 0 days.

(21) Appl. No.: 12/324,126

(22) Filed: Nov. 26, 2008

(65) Prior Publication Data

US 2009/0136312 A1 May 28, 2009

Related U.S. Application Data

(63) Continuation of application No. PCT/EP2007/004243, filed on May 12, 2007.

(30) Foreign Application Priority Data

May 30, 2006  (DE) ........................ 10 2006 026 184

(51) Int. Cl.
 *B23Q 1/01* (2006.01)
 *B23Q 39/02* (2006.01)
(52) U.S. Cl. .......................................... 82/117; 82/121
(58) Field of Classification Search .................. 82/117, 82/120, 121, 122, 123, 131, 150, 151, 158; 409/201, 202
See application file for complete search history.

(56) References Cited

U.S. PATENT DOCUMENTS

| | | | | |
|---|---|---|---|---|
| 2,847,911 A | * | 8/1958 | Stephan | 409/187 |
| 3,203,314 A | * | 8/1965 | Ried | 409/168 |
| 3,546,774 A | * | 12/1970 | Horst et al. | 483/48 |
| 4,616,397 A | * | 10/1986 | Yasukawa | 483/54 |
| 5,699,598 A | | 12/1997 | Hessbrüggen et al. | |
| 6,189,427 B1 | | 2/2001 | Kosho et al. | |
| 6,484,611 B1 | | 11/2002 | Grossmann | |
| 6,651,535 B2 | | 11/2003 | Hafla et al. | |

FOREIGN PATENT DOCUMENTS

| | | |
|---|---|---|
| DE | 195 28 404 A1 | 2/1997 |
| DE | 199 04 859 A1 | 8/2000 |
| DE | 199 59 961 A1 | 6/2001 |

(Continued)

*Primary Examiner*—Will Fridie, Jr.
(74) *Attorney, Agent, or Firm*—Reinhart Boerner Van Deuren P.C.

(57) ABSTRACT

The invention relates to a turning center which comprises a machine frame, a first workpiece spindle unit having a first workpiece spindle, a second workpiece spindle unit, which is disposed on the machine frame and having a second workpiece spindle, at least one tool carrier unit, which is disposed on the machine frame and on which at least one tool for machining a workpiece held in the workpiece spindle units is disposed, and a working space, in which workpieces held in the workpiece spindle units can be machined with the tool. The aim of the invention is to provide a turning center which is compact as possible while allowing extensive turning and/or milling applications, and also ensures highest possible machining accuracy. For this purpose, the machine frame having a machine bed formed by two spaced-apart columns, by the first workpiece spindle unit being disposed on a front side of a first of the columns, facing the working space, by the second workpiece spindle unit being disposed on a front side of a second of the columns, facing the working space, and by the at least one tool carrier unit being disposed on a transverse side of one of the columns, facing the respective other column.

40 Claims, 16 Drawing Sheets

FOREIGN PATENT DOCUMENTS

| | | |
|---|---|---|
| EP | 0 737 544 A2 | 10/1996 |
| EP | 1 074 333 A2 | 2/2001 |
| EP | 1 240 974 A2 | 9/2002 |
| GB | 2 178 991 A | 2/1987 |
| JP | 06134601 A | 5/1994 |
| JP | 06134602 A | 5/1994 |
| JP | 2005111631 A | 4/2005 |

* cited by examiner

TURNING CENTER

CROSS-REFERENCE TO RELATED PATENT APPLICATIONS

This application is a continuation of International application No. PCT/EP2007/004243 filed on May 12, 2007.

This patent application claims the benefit of International application No. PCT/EP2007/004243 of May 12, 2007 and German application No. 10 2006 026 184.4 of May 30, 2006, the teachings and disclosure of which are hereby incorporated in their entirety by reference thereto.

BACKGROUND OF THE INVENTION

The invention relates to a turning center comprising a machine frame, a first workpiece spindle unit, which is disposed on the machine frame and has a first workpiece spindle that is rotatable about a first workpiece spindle axis, a second workpiece spindle unit, which is disposed on the machine frame and has a second workpiece spindle that is rotatable about a second workpiece spindle axis, at least one tool carrier unit, which is disposed on the machine frame and on which at least one tool for machining a workpiece held in the workpiece spindle units is disposed, and a working space, in which workpieces held in the workpiece spindle units can be machined with the tool.

Turning centers of this type are known from the prior art, requiring a disadvantageously great amount of space.

It is therefore an object of the invention to improve a turning center of the generic type in such a way that it is constructed to be as compact as possible while allowing extensive turning and/or milling applications, and also ensures highest possible machining accuracy.

SUMMARY OF THE INVENTION

This object is achieved according to the invention in the case of a turning center of the type described at the beginning by the machine frame having a machine bed formed by two spaced-apart columns, by the first workpiece spindle unit being disposed on a front side of a first of the columns, facing the working space, by the second workpiece spindle unit being disposed on a front side of a second of the columns, facing the working space, and by the at least one tool carrier unit being disposed on a transverse side of one of the columns, facing the respective other column.

The advantage of the solution for achieving the object as provided by the invention can be seen in the possibility of the turning center being constructed as compactly as possible, with high stability of the machine bed, as a result of two columns being used for constructing the machine bed.

It is particularly advantageous here if the columns extend with their longitudinal axes transversely in relation to the standing area for the machine frame, so that the columns rise up over the standing area and consequently allow attachment of the workpiece spindle units and the tool carrier unit in a simple manner.

In principle, it would be conceivable here for the columns to extend with their longitudinal axes in different directions, for example in a V-shaped manner in relation to one another.

A particularly advantageous configuration provides, however, that the columns extend parallel to one another.

Furthermore, within the scope of the solutions described so far, the columns could be formed in such a way that they extend obliquely with their longitudinal axes, that is to say at an acute angle in relation to the standing area. However, a suitable solution provides that the columns extend substantially perpendicularly in relation to the standing area.

Furthermore, the columns could in principle also be of different lengths.

A structurally advantageous solution provides, however, that the columns are of approximately the same length.

The space that is obtained by the columns being spaced apart could optionally also be spanned by a wall or a connecting structure between the columns.

A particularly advantageous solution, however, provides that at least one opening is provided between the columns, that is to say that a clearance that is freely accessible from both sides exists between the columns.

When providing an opening, it would be conceivable in the simplest case for the columns to rise up over a frame base and not be connected to one another.

In order, however, to be able to position the columns stably in relation to one another, it is preferably provided that the columns are connected by at least one cross bracing.

In the case of an opening, it is provided here that the cross bracing lies outside the opening.

A structurally advantageous solution provides that the columns are connected at the ends by at least one cross bracing.

The at least one cross bracing may be provided here on a side opposite from the frame base.

However, it is also conceivable for the columns to be connected to one another by a cross bracing at both of their ends.

The cross bracing may be formed in a wide variety of ways.

For example, the cross bracing may be a separate part that is to be connected to the columns.

A solution that is structurally particularly suitable for stability provides that the at least one cross bracing is formed onto at least one of the columns and consequently forms a unit with at least one of the columns. In this case, the cross bracing may then be releasably connected to the other column.

However, it is also conceivable to form the cross bracing integrally as a part formed onto both columns.

With regard to the forming of a machine bed constructed according to the invention, no further details have been specified so far. Thus it would in principle be conceivable to form the machine bed as a one-piece part, but it is advantageous for reasons of simpler production to form the machine bed such that it is made up of two parts.

The separation of the machine bed could take place here at a wide variety of points. An advantageous solution provides that the machine bed is made up of a first column with at least one crosspiece and a second column, the first column with the at least one crosspiece and the second column forming the two parts of the machine bed.

A structural solution that is particularly suitable with regard to stability provides that the columns are connected to form a yoke-like body.

Such a yoke-like body provides, in particular, that it encloses at least one opening.

However, it also constitutes a yoke-like body if it encloses two openings.

With regard to the forming of the front sides of the columns, no further details have been specified so far.

Thus an advantageous solution provides that the columns have flat front sides, so that the workpiece spindle units can be mounted on them in a simple manner.

Furthermore, it is provided with regard to the shape of the front sides that the respective front side runs transversely in relation to the standing area of the machine frame, it being provided in an advantageous solution that the two front sides lie in a common geometric plane.

In addition, it is likewise provided in a suitable way that the columns have mutually facing flat transverse sides, it being possible for a tool carrier unit to be mounted on at least one of these transverse sides.

The flat transverse sides are preferably disposed here on opposite sides of the opening.

Furthermore, it is preferably also likewise provided that the transverse sides run transversely to a standing area of the machine frame.

With regard to the forming of the columns themselves, no further details have been specified so far.

Thus the columns could in principle have any cross-sectional form; such a cross-sectional form may be round or oval here, the front sides and the transverse sides optionally being flattened portions of a round or oval cross-sectional form.

However, it is also conceivable for the columns to have polygonal cross-sectional forms.

For example, a triangular cross-sectional form of the columns would be conceivable.

A particularly advantageous solution provides that the columns have approximately rectangular cross-sectional forms.

With regard to the way in which the workpiece spindle units are disposed on the columns, no further details have been specified so far.

In principle, it would be conceivable to dispose the workpiece spindle units in a stationary manner on the front sides of the columns.

A particularly advantageous solution provides that at least one of the workpiece spindle units is guided movably in relation to the machine bed parallel to the respective front side, in order to be able to realize, with the workpiece spindle unit, an axial movement that is required for the machining of the workpiece.

However, it is suitable if each of the workpiece spindle units is guided movably in relation to the machine bed along defined movement axes parallel to the front side respectively carrying said units.

In order to obtain an advantageous distribution of the axial movements in the case of the turning center according to the invention, it is preferably provided that at least one of the workpiece spindle units is guided movably in relation to the machine bed parallel to the respective workpiece spindle axis.

It is preferably provided that both the workpiece spindle units are guided movably in relation to the machine frame parallel to their respective workpiece spindle axis.

In order to obtain yet a further degree of freedom, it is preferably also provided that a workpiece spindle unit is guided in relation to the machine bed transversely to the respective workpiece spindle axis.

In order to be able to machine a workpiece with the two workpiece spindle units as optimally as possible, it is preferably provided that both workpiece spindle units are movable with their workpiece spindle axes in a common geometric spindle guiding plane.

With regard to the number of tool carrier units, no further details have been specified so far. It has merely been stated that at least one tool carrier unit is required.

It is particularly advantageous, however, if two tool carrier units are provided.

An advantageous distribution of the tool carrier units is obtained if each of the two tool carrier units is disposed on a transverse side of one of the columns of the machine bed.

It would be conceivable in principle to dispose both tool carrier units on one column.

However, it is particularly advantageous if a first tool carrier unit and a second tool carrier unit are disposed on different columns of the machine bed.

A solution that is particularly advantageous with regard to precision during the machining provides that a first tool carrier unit is provided and that the first tool carrier unit is associated with the first workpiece spindle unit, so that machining of a workpiece held on the first workpiece spindle unit can be realized in a simple manner.

It is advantageous here with regard to the machining precision if the first tool carrier unit is disposed on the column carrying the first workpiece spindle unit.

Furthermore, a second tool carrier unit is preferably provided, and the second tool carrier unit is associated with the second workpiece spindle unit.

In this case, it is likewise advantageous if the second tool carrier unit is disposed on the column carrying the second workpiece spindle unit.

With regard to the way in which the respective tool carrier unit is disposed in relation to the opening, no further details have been specified so far.

Thus an advantageous solution provides that the tool carrier unit extends into the opening.

It is preferably even provided that the tool carrier unit extends through the opening.

The tool carrier unit is preferably constructed in such a way that it has a tool carrier base and a tool carrier.

In particular, the tool carrier base is formed in such a way that it is disposed at least partially in the opening.

Furthermore, an advantageous embodiment provides that the tool carrier is movable in the working space outside the opening.

In order to utilize the space optimally, it is preferably provided that the tool carrier unit has a drive unit, which is disposed on a side of the tool carrier base that is opposite from the tool carrier.

The drive unit is suitably disposed on a side of the machine bed that is opposite from the tool carrier, so that it does not have any adverse influence with regard to the utilization of space in the region of the working space and lies on a side of the machine bed on which it has no disturbing influence with regard to its spatial extent.

In particular, it is also provided in the case of this solution that the drive unit is disposed on the side of the opening that is opposite from the tool carrier.

With regard to the movability of the tool carrier, no further details have been specified so far. Thus an advantageous embodiment provides that the tool carrier of the at least one tool carrier unit is movable parallel to a tool guiding plane which runs transversely to the workpiece spindle axis of the workpiece spindle associated with it.

Furthermore, it is provided here that the tool carrier of the at least one tool carrier unit is movable in the tool guiding plane in a first direction, running parallel to the spindle guiding plane.

A further suitable embodiment provides that the tool carrier of the at least one tool carrier unit is movable in a second direction, running perpendicularly to the spindle guiding plane.

Finally, in the case of an advantageous solution, it is provided that the tool carrier of the at least one tool carrier unit is rotatable about an axis running parallel to the tool guiding plane.

With regard to the way in which the tool carrier base is disposed in relation to the machine bed, no further details have been specified so far. Thus a suitable solution provides that the tool carrier base is disposed on a tool slide.

The tool slide is preferably movable here in a direction of slide advance, which runs approximately parallel to a longitudinal direction of the respective column.

Furthermore, the tool slide is preferably movable in a direction of slide advance which runs approximately parallel to a transverse direction in relation to the respective workpiece spindle axis.

In particular, the tool slide is movable in a direction of slide advance which runs approximately parallel to the respective transverse side on which the tool slide is disposed.

Furthermore, it is provided that the tool slide is movable in an X direction of the turning center.

With regard to the way in which a further direction of advance of the tool carrier is realized, it is provided that the tool carrier is movable in a direction of advance with respect to the tool carrier base.

The direction of advance preferably runs approximately parallel to a transverse direction in relation to the respective workpiece spindle axis.

Here, the direction of advance is preferably a Y direction of the turning center.

In particular, in this case the direction of advance runs parallel to a transverse direction in relation to the direction of slide advance along which the tool carrier base is movable.

In addition, the tool carrier is preferably rotatable about an axis of rotation with respect to the tool carrier base.

In particular, the axis of rotation is aligned such that it runs approximately parallel to the direction of advance.

The axis of rotation is preferably aligned such that it runs in a direction which is aligned parallel to a transverse direction in relation to the respective workpiece spindle axis.

Furthermore, in particular, the axis of rotation runs parallel to a transverse direction in relation to the direction of slide advance.

A preferred solution provides that the axis of rotation is a B axis of the turning center.

In order to be able to realize the movability of the tool carrier in relation to the tool carrier base, it is preferably provided that the tool carrier is connected to the tool carrier base by a guiding arm, the guiding arm with the tool carrier suitably being movable in relation to the tool carrier base.

With regard to the forming of the tool carrier, no further details have been specified in connection with the description so far of the individual exemplary embodiments. Thus an advantageous solution provides that the tool carrier has a tool spindle.

For example, it is provided in the case of such a tool spindle that a tool spindle housing is held on the guiding arm of the tool carrier unit.

Here, the tool spindle housing is preferably fixedly connected to a front end of the guiding arm.

The tool spindle may be formed and disposed in relation to the axis of rotation of the tool carrier unit in various ways. An advantageous solution provides that the tool spindle has a tool spindle axis aligned transversely to the axis of rotation.

The tool spindle is preferably likewise formed in such a way that it has a tool spindle axis aligned transversely to the direction of advance.

Furthermore, a spindle shaft mounted in the tool spindle housing is provided with a tool receiving means at one end.

Furthermore, the tool receiving means is disposed in relation to the axis of rotation on one side of the same.

In the case of such a tool spindle, initially only one tool can be used.

In order to increase the number of tools that can be used, it is preferably provided that the tool spindle housing has a supplementary tool carrier.

Such a supplementary tool carrier could in principle be disposed anywhere on the tool spindle housing.

For example, it would be conceivable to dispose the supplementary tool carrier on the tool spindle housing on a side opposite from the tool receiving means.

However, a particularly advantageous solution provides that the supplementary tool carrier is disposed on the tool spindle housing on at least one side of the tool spindle axis.

A further suitable solution provides that the tool spindle housing carries a supplementary tool carrier on more than one side, so that there is the possibility of using a number of tool carriers and in this way multiplying still further the number of tools that can be used.

It is particularly suitable here if the tool spindle housing carries a supplementary tool carrier on mutually opposite sides.

The supplementary tool carriers are preferably disposed here on the tool spindle housing on mutually opposite sides of the axis of rotation.

In order to be able to increase the number of tools further, it is suitably provided that the supplementary tool carrier is formed as a multiple tool carrier.

Such a multiple tool carrier could, for example, have tools disposed in a two-dimensional area.

However, it is particularly suitable if the multiple tool carrier is formed as a linear tool carrier, since such a linear tool carrier has spatially suitable conditions for the disposition of the multiple tools while at the same time causing little disturbance of the other tools during the use of one of the tools on the workpiece.

Such a linear tool carrier may be disposed in a wide variety of ways.

For example, it would be conceivable to align the linear tool carrier parallel to the tool spindle axis.

However, it is particularly suitable if the linear tool carrier has tool receiving means disposed in a direction of a row parallel to the direction of advance of the tool spindle, the direction of advance being the direction along which movement of the tool spindle takes place in relation to the tool carrier base.

Such tool receiving means are usually tool holder receiving means, in which tool holders carrying tools can be inserted. However, it is also conceivable to form the tool receiving means in such a way that tools, such as drilling tools for example, can be inserted into them directly.

In order to create particularly advantageous spatial possibilities for using the tools, it is preferably provided that all the tool receiving means of the linear tool carrier lie in one tool plane.

In the case of a tool spindle with linear tool carriers, it is particularly advantageous if a tool plane of the tool spindle and the tool planes of the linear tool carriers that follow this tool spindle plane respectively form with one another an included angle that is greater than 90° and less than 180°.

It is preferably provided that each two successive tool planes form with one another an included angle that is greater than 100°, still better greater than 110°, in particular approximately 120°.

This provides the possibility of using the tools located in one of the tool planes in such a way that the tools located in the other tool planes require as little space as possible, and consequently also impede other machining operations as little as possible by their extent.

A further advantageous solution of a tool carrier unit according to the invention provides that the tool carrier is formed as a multiple linear tool carrier, that is to say is made up of a multiplicity of linear tool carriers.

It is preferably provided here that the linear tool carriers have tool receiving means lined up in a direction of a row parallel to the direction of advance of the multiple linear tool carrier, the direction of advance being the direction along which the multiple linear tool carrier is movable in relation to the tool carrier base.

In particular, it is also the case with such a multiple linear tool carrier that all the tool receiving means of each of the linear tool carriers are disposed in one tool plane.

It is suitably also the case with such a multiple linear tool carrier that the tool planes of the linear tool carriers are disposed such that each two successive tool planes form with one another an included angle that is greater than 90° and less than 180°.

It is preferably also the case with such a multiple linear tool carrier that the included angle which successive tool planes of the linear tool carriers each form with one another is greater than 100°, still better greater than 110°, in particular approximately 120°

In the case of a further advantageous exemplary embodiment, it is preferably provided that the tool carrier is formed as a tool turret.

In the case of a tool turret, it is provided that the tool turret has a turret head, which is rotatable about a turret axis.

It is preferably provided in the case of this solution that the turret axis intersects the axis of rotation about which the tool turret is rotatable with respect to the tool carrier base.

In this case, a turret housing of the tool turret is preferably fixedly connected to the guiding arm.

Such a turret head is developed for example in such a way that it has tool receiving means which are disposed in such a way that tool directions of tools inserted in it lie in one tool plane.

Such a tool plane is preferably aligned such that it runs perpendicularly to the turret axis.

Furthermore, it is particularly advantageous with regard to the acceptance of the forces acting on the tools if the axis of rotation about which the tool turret is rotatable with respect to the tool carrier base runs parallel to the tool plane.

It is particularly advantageous if a point of intersection of the axis of rotation and the turret axis lies in the tool plane.

Further features and advantages of the invention are the subject of the following description and the pictorial representation of a number of exemplary embodiments.

DETAILED DESCRIPTION OF THE INVENTION

Figure 1:
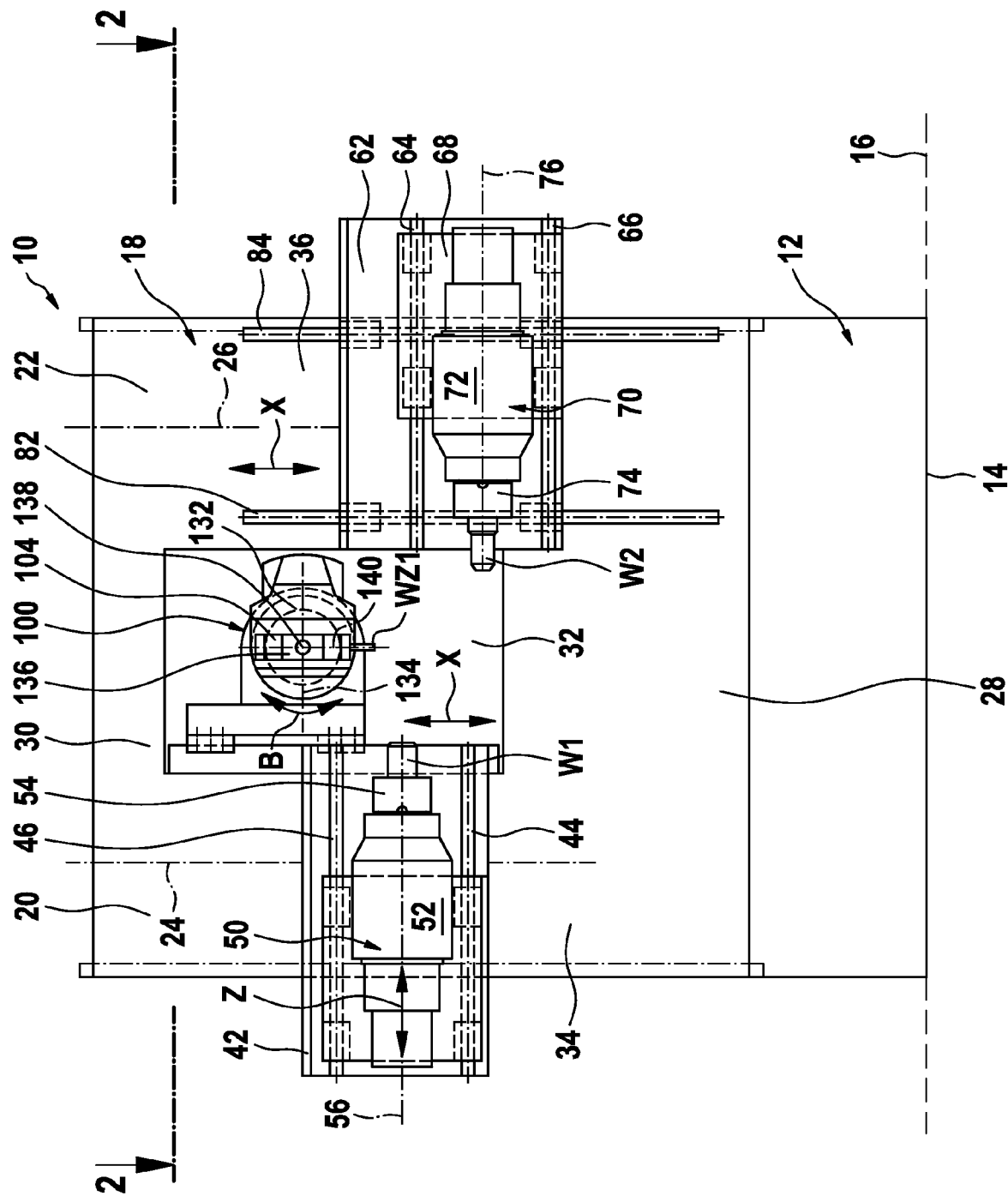
FIG. 1 shows a schematic front view of a first exemplary embodiment of a turning center according to the invention.

A first exemplary embodiment of a turning center according to the invention comprises a machine frame, which is designated as a whole by 10 and has a frame base 12, which rests with its underside 14 on a standing area 16, and a machine bed 18, which rises up above the frame base 12 and comprises a first column 20 and a second column 22, which are spaced apart and extend away from the frame base 12 with longitudinal axes 24, 26 running approximately parallel to one another, the longitudinal axes 24, 26 preferably running transversely to the standing area 16, preferably perpendicularly thereto.

The two columns 20, 22 could in principle rise up above the frame base 12 independently of one another. However, a more stable construction of the machine bed 18 is one in which the two columns 20, 22 are connected to one another by a first cross bracing 28 and a second cross bracing 30.

Furthermore, the two columns 20, 22 are spaced apart in such a way that between them there is a sufficiently large opening 32, which in the case of the cross bracings 28, 30 is enclosed on all sides by the machine bed, so that the machine bed 18 is formed overall in the manner of a yoke and consequently surrounds the opening 32 in a closed yoke-like manner.

Furthermore, the first column 20 has a first front side 34 and the second column 22 has a second front side 36, which are facing a working space 40, which is disposed on one side of the machine bed 18 and lies in front of the two front sides 34, 36 and in front of the opening 32 and extends in front of the machine bed 18 transversely to the longitudinal axes 24, 26 and in a direction parallel to the longitudinal axes 26.

Figure 2:
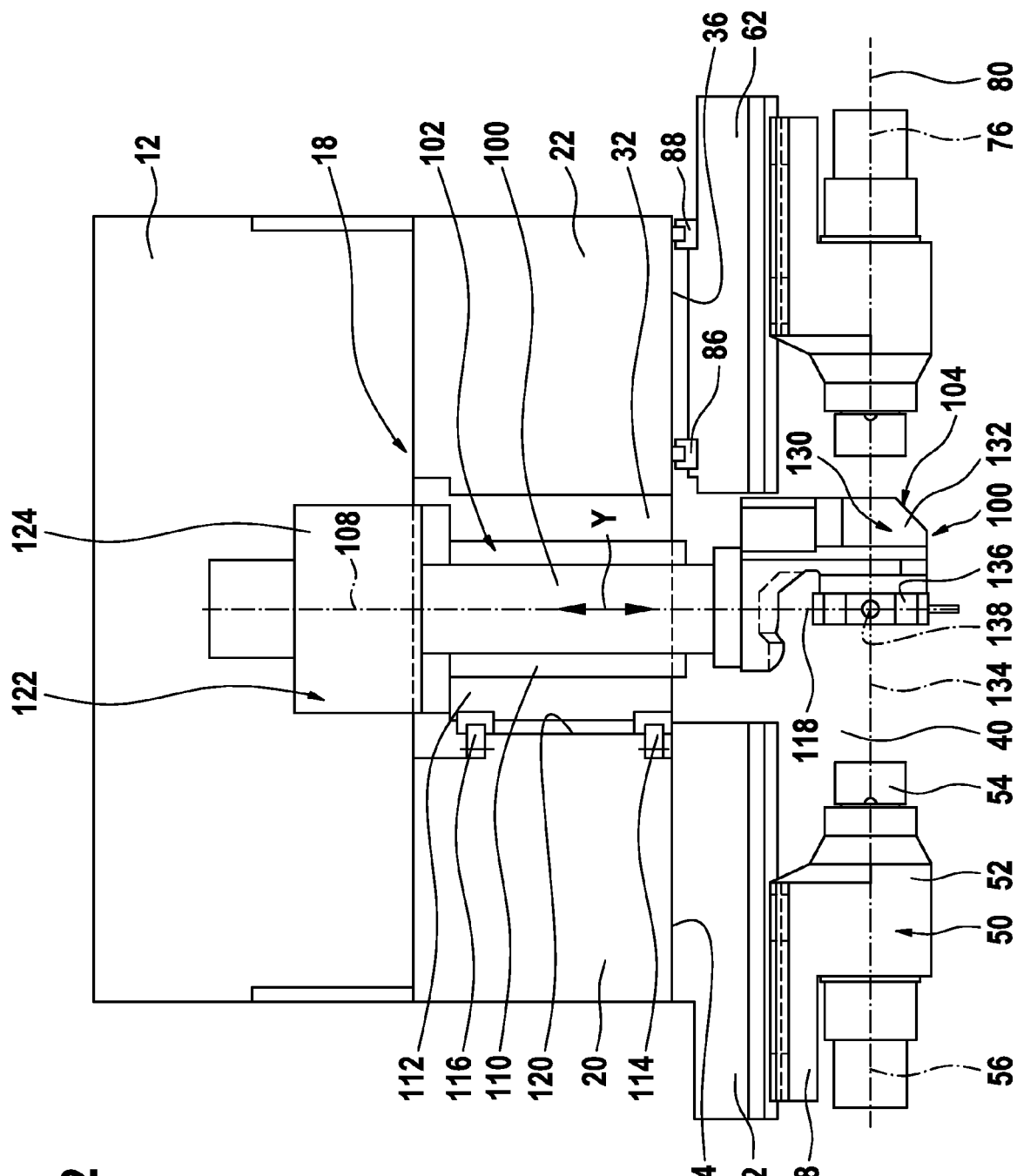
FIG. 2 shows a section along line 2-2 in FIG. 1.

As further represented in FIGS. 1 and 2, disposed on the first front side 34 is a base body 42 with slide guides 44, 46, which run parallel to one another, extend transversely to the longitudinal axis 24 of the first column 20 and on which a spindle slide 48 is guided, on which slide a first workpiece spindle unit designated as a whole by 50 is disposed, this unit comprising a first workpiece spindle housing 52 in which a first workpiece spindle 54 is mounted rotatably about a first workpiece spindle axis 56.

The workpiece spindle axis 56 preferably runs parallel to the slide guides 44, 46 and also substantially in a horizontal direction.

The slide guides 44, 46 seated on the base body 42 consequently have the effect that the first workpiece spindle unit 50 is movable in a direction parallel to the first workpiece spindle axis 56, and consequently in a so-called Z direction in relation to the first column 20.

Likewise provided on the second front side 36 of the second column 22 is a base body 62, on which there are disposed slide guides 64, 66 that likewise run transversely to the longitudinal axis 26 and on which guides a spindle slide 68 is movably mounted.

The spindle slide 68 also carries a second workpiece spindle unit 70 with a second workpiece spindle housing 72, in which a second workpiece spindle 74 is mounted rotatably about a second workpiece spindle axis 76.

In particular, the first workpiece spindle axis 56 and the second workpiece spindle axis 76 lie in a spindle guiding plane which is designated as a whole by 80 and preferably runs parallel to the front sides 34 and 36 and at a distance from them.

In principle, it would be conceivable to dispose the base body 62 on the front side 36 in a stationary manner, to be precise in such a way that the first and second workpiece spindle axes 56 and 76 are in line with one another.

In the case of the first exemplary embodiment, as represented in FIGS. 1 and 2, provided on the front side 36 are slide guides 82, 84, on which the base body 62 is guided by guiding bodies 86, 88, the slide guides 82, 84 preferably running approximately parallel to the longitudinal axis 26 of the column 22.

Consequently, the second workpiece spindle unit 70 is movable on the one hand likewise in the Z direction by the spindle slide 68 and on the other hand also in a so-called X direction, which runs perpendicularly to the spindle axes 56 and 76, by travel of the base body 62 on the slide guides 82 and 84 relative to the second column 22.

The first workpiece spindle 54 and the second workpiece spindle 74 are formed in such a way that a workpiece clamping device that is not pictorially represented is provided on the side facing the respective other workpiece spindle 74 or 54, by which device a first workpiece W1 can be fixed in the first workpiece spindle 54 and a second workpiece W2 can be fixed in the second workpiece spindle 74 and, for machining the same, can be rotated about the respective workpiece spindle axis 56 or 76.

As represented in FIGS. 1 and 2, the turning center according to the invention is provided with a tool carrier unit, which is designated as a whole by 100 and has a tool carrier base 102, extending partially in the opening 32, and a tool carrier 104, disposed in the working space 40.

The tool carrier 104 is seated here on a guiding arm 106, which is mounted in the tool carrier base 102 displaceably in relation to the tool carrier base 102 in the direction of a longitudinal axis 108 of the guiding arm 106 and is also rotatable in the tool carrier base 102, about the longitudinal axis 108 of the guiding arm 106.

For this purpose, the guiding arm 106 is preferably guided in a longitudinal and rotary guide 110 of the tool carrier base 102.

The longitudinal and rotary guide 110 of the tool carrier base 102 is seated here on a tool carrier slide 112, which for its part is guided on slide guides 114, 116.

The slide guides 114, 116 are seated on a first transverse side 120 of the first column 20, which is facing the opening 32 and the opposite second column 22.

The slide guides 114, 116 preferably extend here parallel to the longitudinal axis 24 of the first column 20, so that the tool carrier slide 112 is movable in the opening 32 along the first column 20, preferably in the X direction.

There is consequently the possibility of feeding a tool WZ1 that is held in the tool carrier 104 in the X direction in the direction of the workpiece W1 that is held in the first workpiece spindle 54.

Furthermore, the longitudinal and rotary guide 110 for the guiding arm 106 is disposed on the tool carrier slide 112 in such a way that, as represented in particular in FIG. 2, the longitudinal axis 108 of the guiding arm 106 runs transversely to the slide guides 114, 116, and consequently also transversely to the spindle guiding plane 80. The longitudinal axis 108 preferably runs perpendicularly to the spindle guiding plane 80.

Consequently, the tool carrier 104 is movable not only by moving the tool carrier slide 112 in the X direction in relation to the workpiece W1, but also movable transversely to the X direction in the direction of the longitudinal axis 108, and consequently in a Y direction, as well as rotatable about the longitudinal axis 108, that is to say about a so-called B axis.

Overall, the tool carrier 104 is consequently movable in a tool guiding plane 118, which runs parallel to the X direction and parallel to the Y direction, the tool guiding plane 118 running transversely, preferably perpendicularly, to the spindle guiding plane 80.

Provided for the movements in the Y direction and the rotation about the B axis is a drive unit, which is designated as a whole by 122 and the housing 124 of which is fixed on the longitudinal and rotary guide 110, and which is disposed on a side of the machine bed 18 that is opposite from the tool carrier 104.

In the case of the first exemplary embodiment, represented in FIGS. 1 and 2, the tool carrier 104 is formed as a tool turret 130 and comprises a turret housing 132, on which a turret head 136 is disposed rotatably about a turret axis 134.

The turret axis 134 runs here transversely, preferably perpendicularly, to the longitudinal axis 108 and intersects the longitudinal axis 108 at a point of intersection 138, which preferably lies in a central plane 140 of the turret head 136.

The tool turret 130 can preferably be used in such a way that the turret housing 132 is always on a side facing away from the respective workpiece. By turning the entire tool turret 130 about the longitudinal axis 108 as an axis of rotation, there is consequently the possibility of using the tools of the turret head 136 for machining the workpiece W1, which has been received in the first workpiece spindle 54, or for machining the workpiece W2, which has been received in the second workpiece spindle 74.

In the case of the structural design of the machine bed 18 according to the invention, the machining in particular of the workpiece W1 accommodated in the first workpiece spindle 54 by the tools of the tool turret 130 is very accurate, since both the first workpiece spindle unit 50 and the entire tool carrier unit 100 are held on the first column 20, the first front side 34 and the transverse side 120 being disposed such that, though they lie on different sides of the column 20, they follow one another in the circumferential direction of the column 20, so that the effects of any thermal expansion of the column 20 on the machining accuracy are minor and thermal stresses otherwise have no significant effect on the relative position of the first front side 34 and the transverse side 120.

Figure 3:
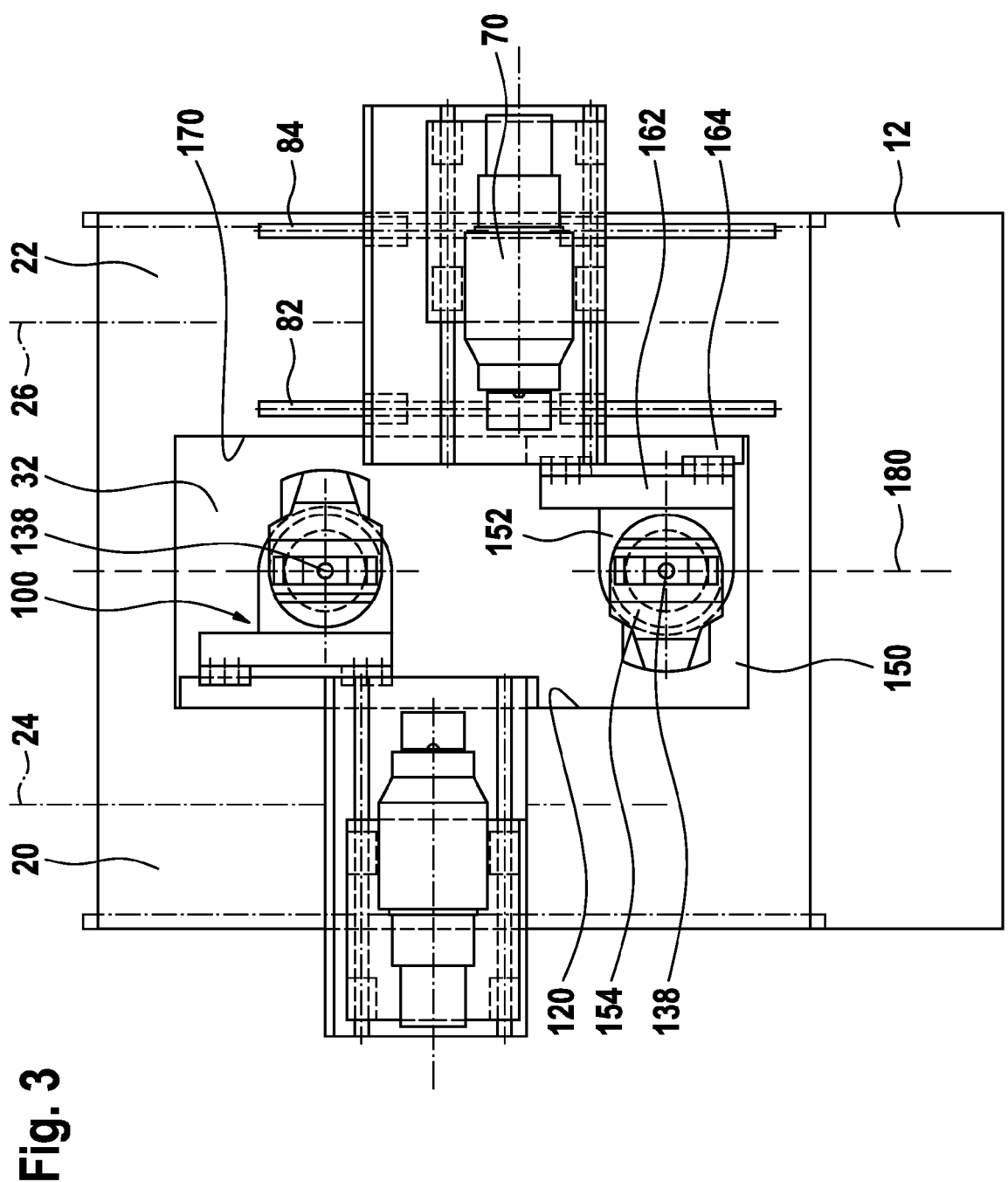
FIG. 3 shows a view similar to FIG. 1 of a second exemplary embodiment of a turning center according to the invention.

In the case of a second exemplary embodiment of a turning center according to the invention, represented in FIG. 3, those elements that are identical to those of the first exemplary embodiment are provided with the same reference numerals, so that, with regard to the description of the same, reference can be made to the statements made with respect to the first exemplary embodiment in their entirety.

By contrast with the first exemplary embodiment, the opening 32 is made to extend in the direction of the longitudinal axes 24, 26 of the columns 20, 22 in such a way that not only the first tool carrier unit 100 can be provided in said opening but also a second tool carrier unit 150, which in the same way as the first tool carrier unit 100 comprises a tool carrier base 152 and a tool carrier 154, the tool carrier base 152 being formed in the same way as the tool base 102, and in particular comprising a tool carrier slide 162, which is held on slide guides 164, 166, which are disposed on a transverse side 170 of the second column 22, the transverse side 170 delimiting the opening 32 and facing the transverse side 120 of the first column 20.

Furthermore, the slide guides 164, 166 are formed in such a way that the second tool carrier unit 150 is movable, substantially in such a way as to avoid any collisions, in relation to the first tool carrier unit 100, guided on the slide guides 114, 116, in this case the second tool carrier unit 150 being disposed between the frame base 12 and the first tool carrier unit 100.

Figure 4:
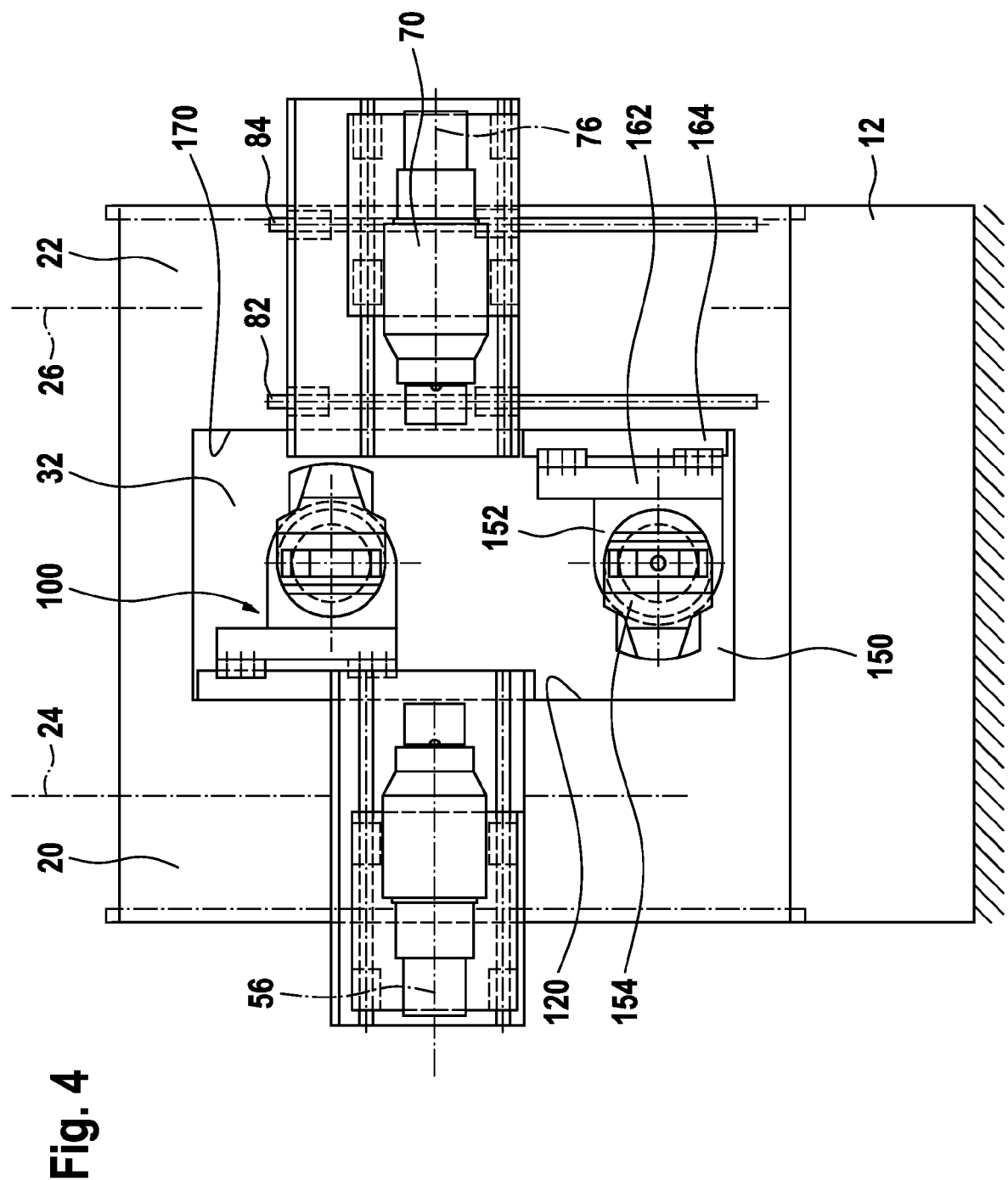
FIG. 4 shows a representation similar to FIG. 3 in a transfer position of the workpiece spindle units.

In the case of the second exemplary embodiment, the second workpiece spindle unit 70 can preferably be made to move along the slide guides 82, 84 to such an extent that it can, on the one hand, be brought into a transfer position which is represented in FIG. 4 and in which the second workpiece spindle axis 76 is aligned coaxially in relation to the first workpiece spindle axis 56, so that, by travel of the two workpiece spindle units 50, 70 in the Z direction parallel to their workpiece spindle axes 56, 76, the workpiece W1 can be transferred for example from the first workpiece spindle 54 into the second workpiece spindle 74.

Figure 5:
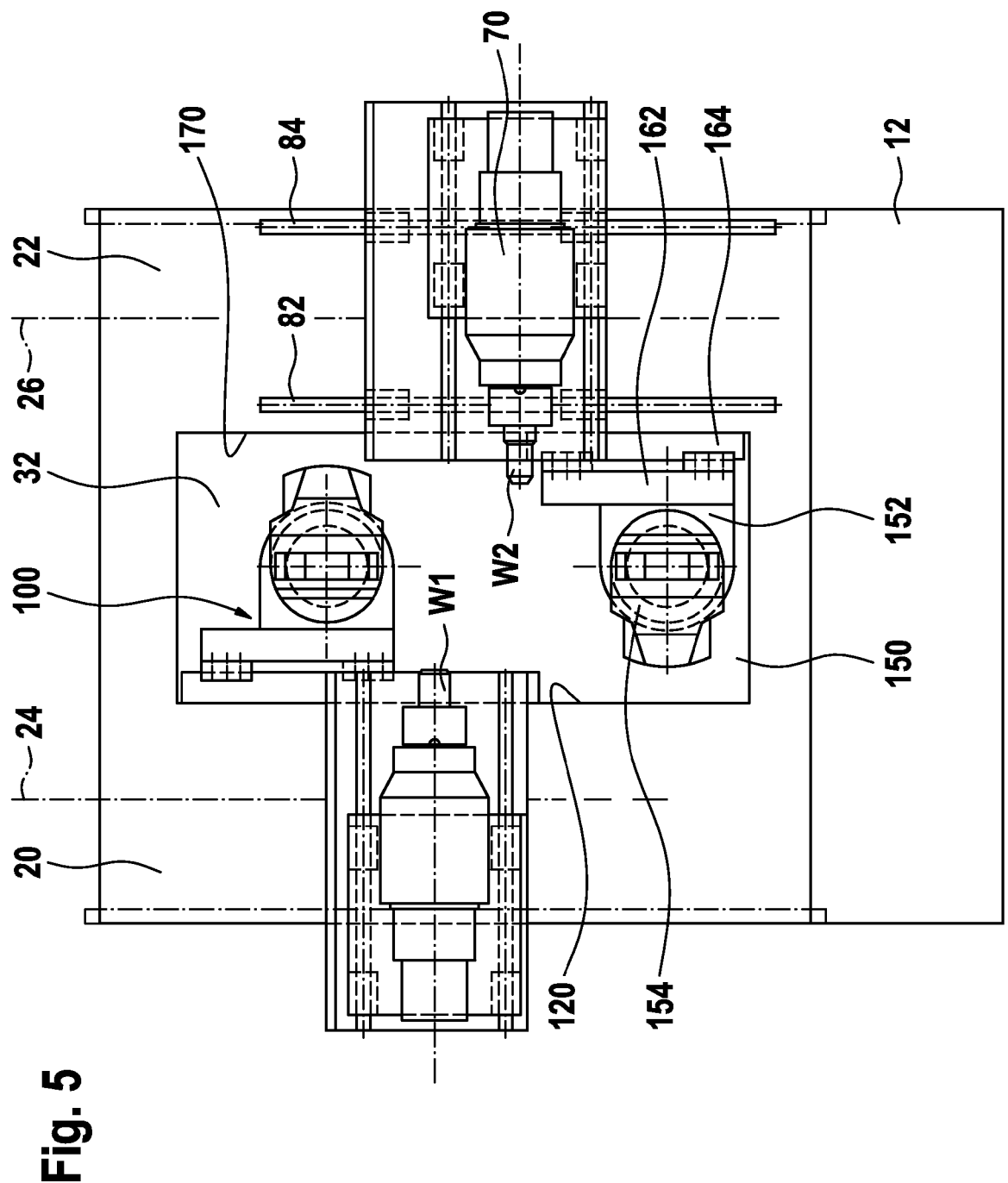
FIG. 5 shows a representation similar to FIG. 3 in a machining position of the workpiece spindle units.

Then, by travel of the base body 62 along the slide guides 82, 84, the second workpiece spindle unit 70 can travel from this transfer position into a machining position, which is represented in FIG. 5 and in which the workpiece W2 that is held in the second workpiece spindle 74 can be machined by means of a tool of the second tool carrier unit 150.

Here, either the second tool carrier unit 150 can travel in the X direction along the slide guides 164, 166 or the second workpiece spindle unit 70 can travel in the X direction along the slide guides 82, 84.

However, it is also conceivable to make both the second tool carrier unit 150 and the second workpiece spindle unit 70 move simultaneously in the X direction.

In addition, the machining of a workpiece W1, which has been received in the first workpiece spindle unit 50, by a tool of the first tool carrier unit 100 can be carried out at the same time.

In the case of the turning center according to the invention, in the machining position, the workpiece spindle units 50, 70 have been displaced in relation to one another to such an extent that, though their workpiece spindle axes 56, 76 run parallel to one another and in the spindle plane 80, they are offset in relation to one another in the spindle plane 80 in a direction running transversely to the workpiece spindle axes 56, 76, in particular the X direction.

Furthermore, in the machining position, the first and second tool carrier units 100, 150 are preferably disposed in such a way that the workpiece spindle axes 56, 76 lie between them, so that no tool is disposed in the space between the mutually offset workpiece spindle axes 56, 76, but instead the tools of the tool carrier units 100, 150 can be respectively fed in the X direction toward the respective workpiece W1 or W2 in the respective workpiece spindle 54 or 74 from a side facing away from the other respective spindle axis 76 or 56.

In the case of the second exemplary embodiment, the tool carrier units 100, 150 are preferably disposed in such a way that the points of intersection 138 of the longitudinal axes 108 and the turret axes 134 lie in a common movement plane 180, the longitudinal axes 108 of the guiding arms 106 also preferably being movable in this movement plane 180.

Here, the movement plane 180 runs in particular centrally through the opening 32 between the columns 20, 22.

Figure 6:
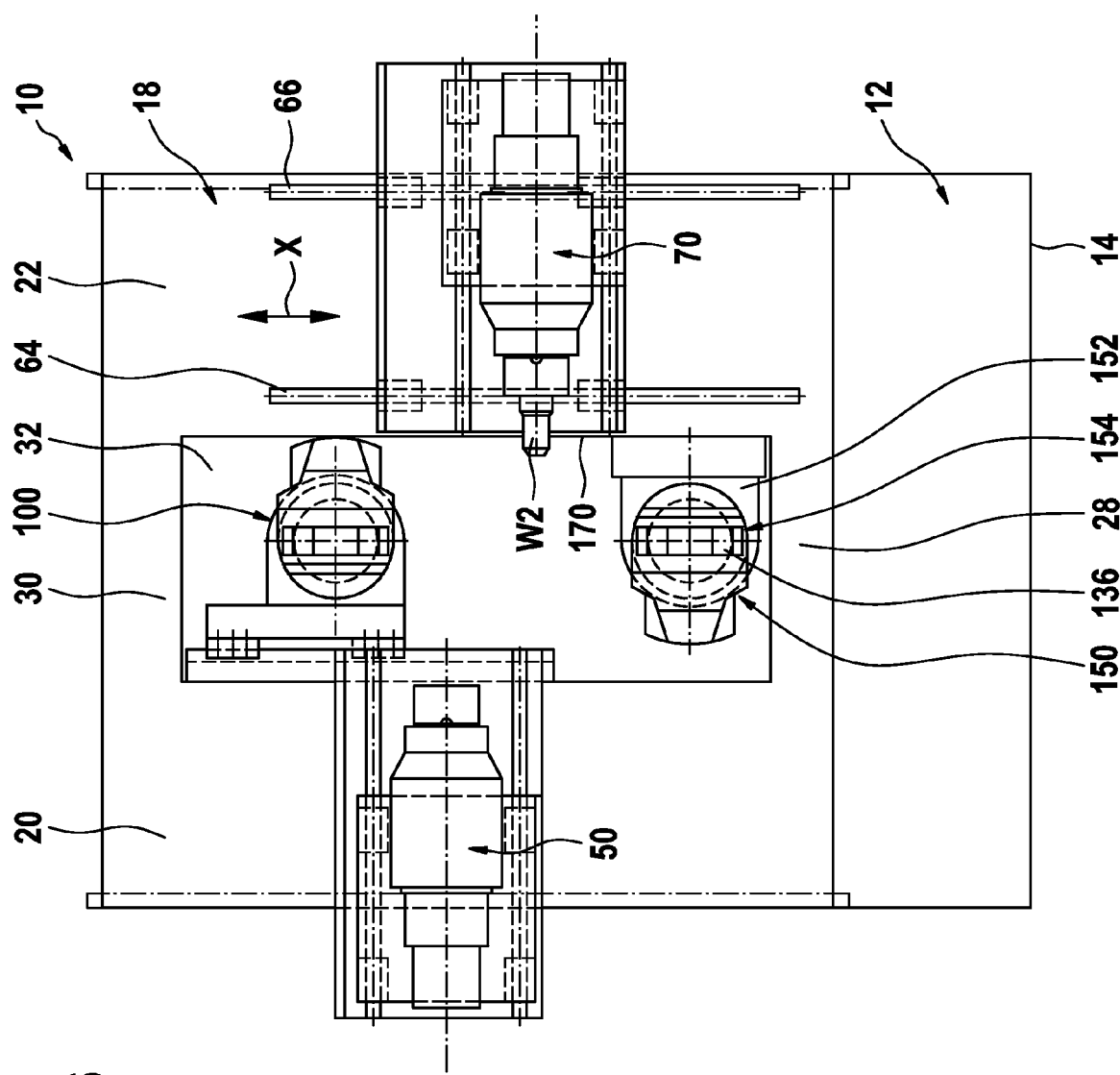
FIG. 6 shows a view similar to FIG. 1 of a third exemplary embodiment of a turning center according to the invention.

In the case of a third exemplary embodiment, represented in FIG. 6, the second tool carrier unit 150 is disposed in a stationary manner on the transverse side 170 of the second column 22, and is consequently not displaceable.

Consequently, to machine workpieces W2 that are held in the second workpiece spindle unit 70, it is necessary to produce the movement in the X direction by moving the second workpiece spindle unit 70 in the X direction, to be precise by displacing the base body 62 on the slide guides 82, 84.

Otherwise, the tool carrier 154 is movable in relation to the tool carrier base 152 in the same way as described in connection with the second exemplary embodiment, so that the tools of the turret head 136 can also be used for machining the workpiece W2 that is held in the second workpiece spindle unit 70.

Figure 7:
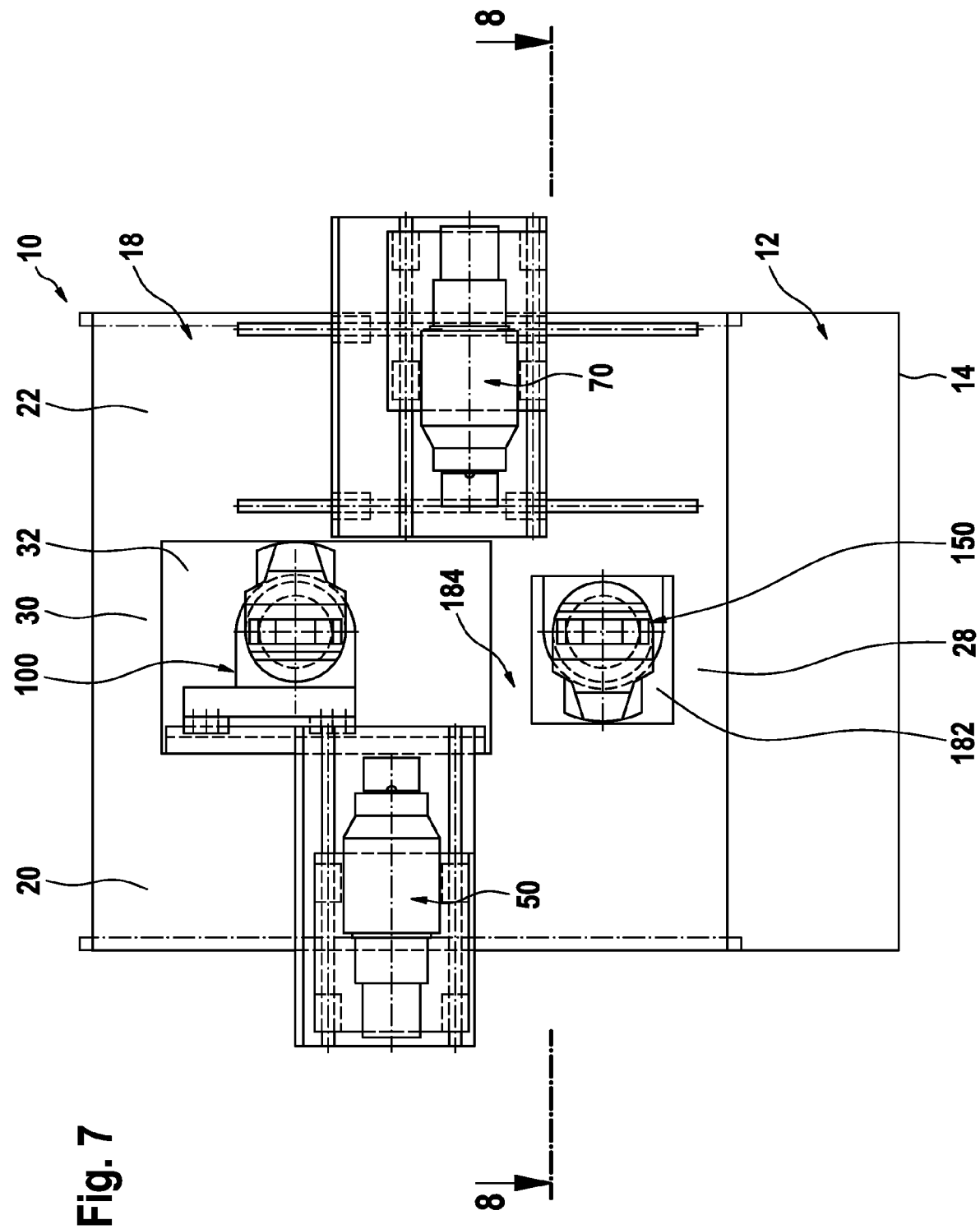
FIG. 7 shows a view similar to FIG. 1 of a fourth exemplary embodiment of a turning center according to the invention.

In the case of a fourth exemplary embodiment, represented in FIG. 7, those elements that are identical to those of the first exemplary embodiment are likewise provided with the same reference numerals, so that, with regard to the description of the same, reference can likewise be made to the statements made with respect to the first exemplary embodiment in their entirety.

By contrast with the first exemplary embodiment, in the opening 32 between the columns 20, 22 only the first tool carrier unit 100 is disposed movably in the X direction, as described in detail in connection with the first exemplary embodiment.

Furthermore, the second tool carrier unit 150 is disposed in an opening 182, provided specifically for this purpose, between the columns 20, 22, the openings 182, 32 being separated from one another by a cross bracing 184, which additionally contributes to improving the stiffness of the machine bed 18.

Figure 8:
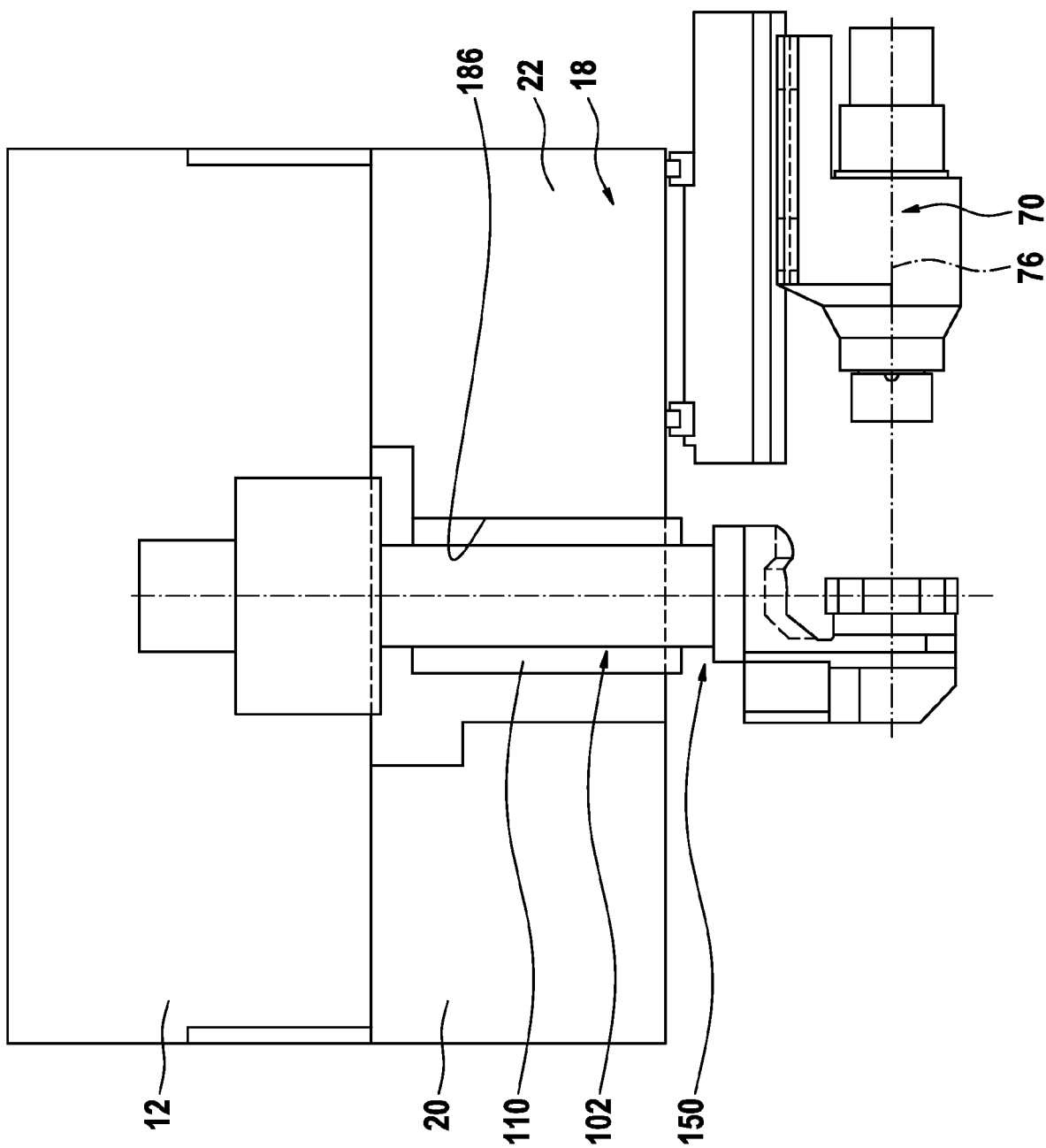
FIG. 8 shows a section along line 8-8 in FIG. 7.

As represented in FIG. 8, in the case of this exemplary embodiment the tool carrier base 152 likewise comprises the longitudinal and rotary guide 110, which for its part however is held in a stationary manner directly by a further transverse side 186 of the second column 22 that is adjacent the opening 182.

Figure 9:
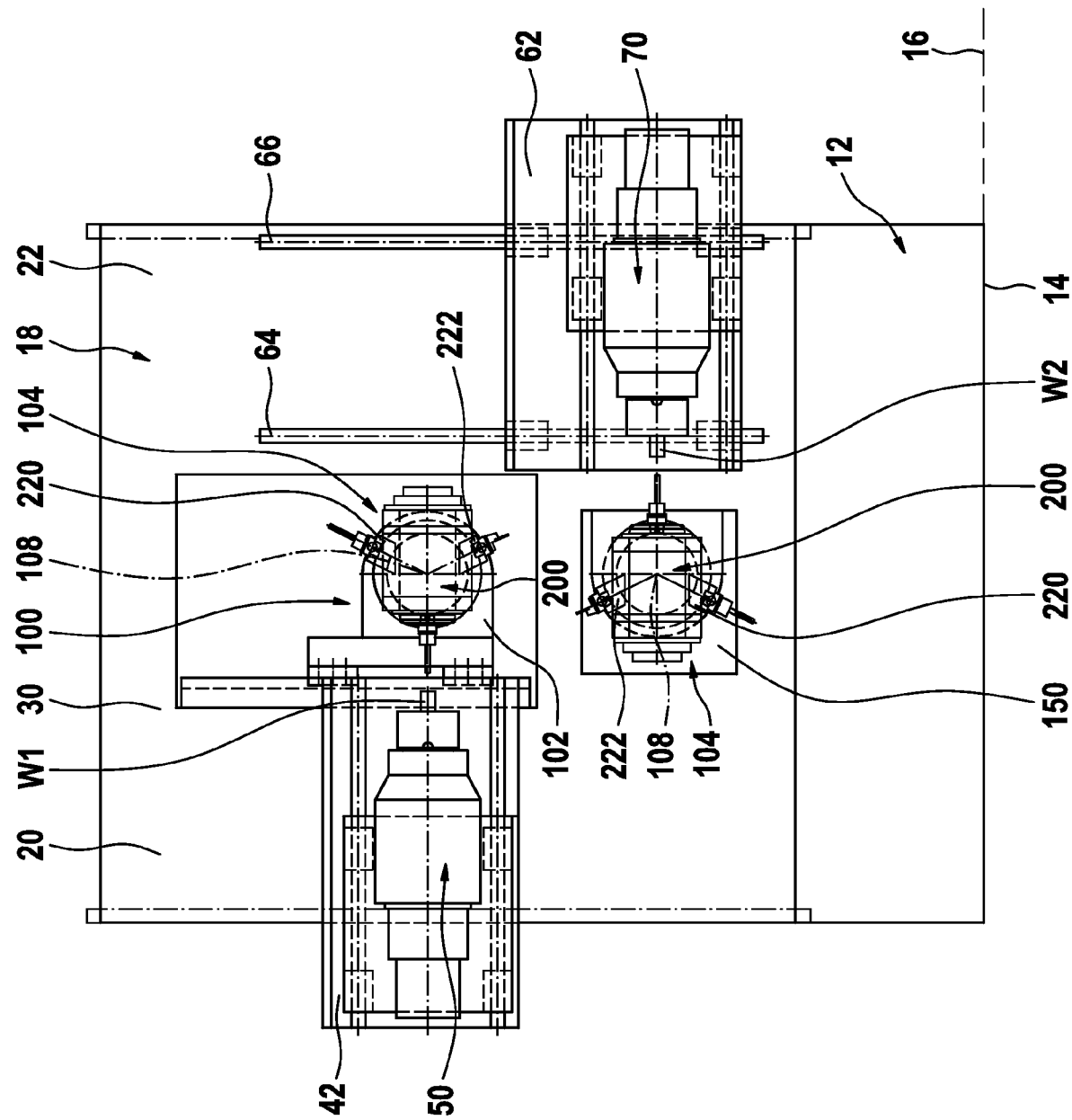
FIG. 9 shows a view similar to FIG. 1 of a fifth exemplary embodiment of a turning center according to the invention.

In the case of a fifth exemplary embodiment, represented in FIG. 9, those elements that are identical to those of the first exemplary embodiment are provided with the same reference numerals, so that, with regard to the description of the same, reference can be made to the statements made with respect to the first exemplary embodiment or the second and third exemplary embodiments in their entirety.

Figure 10:
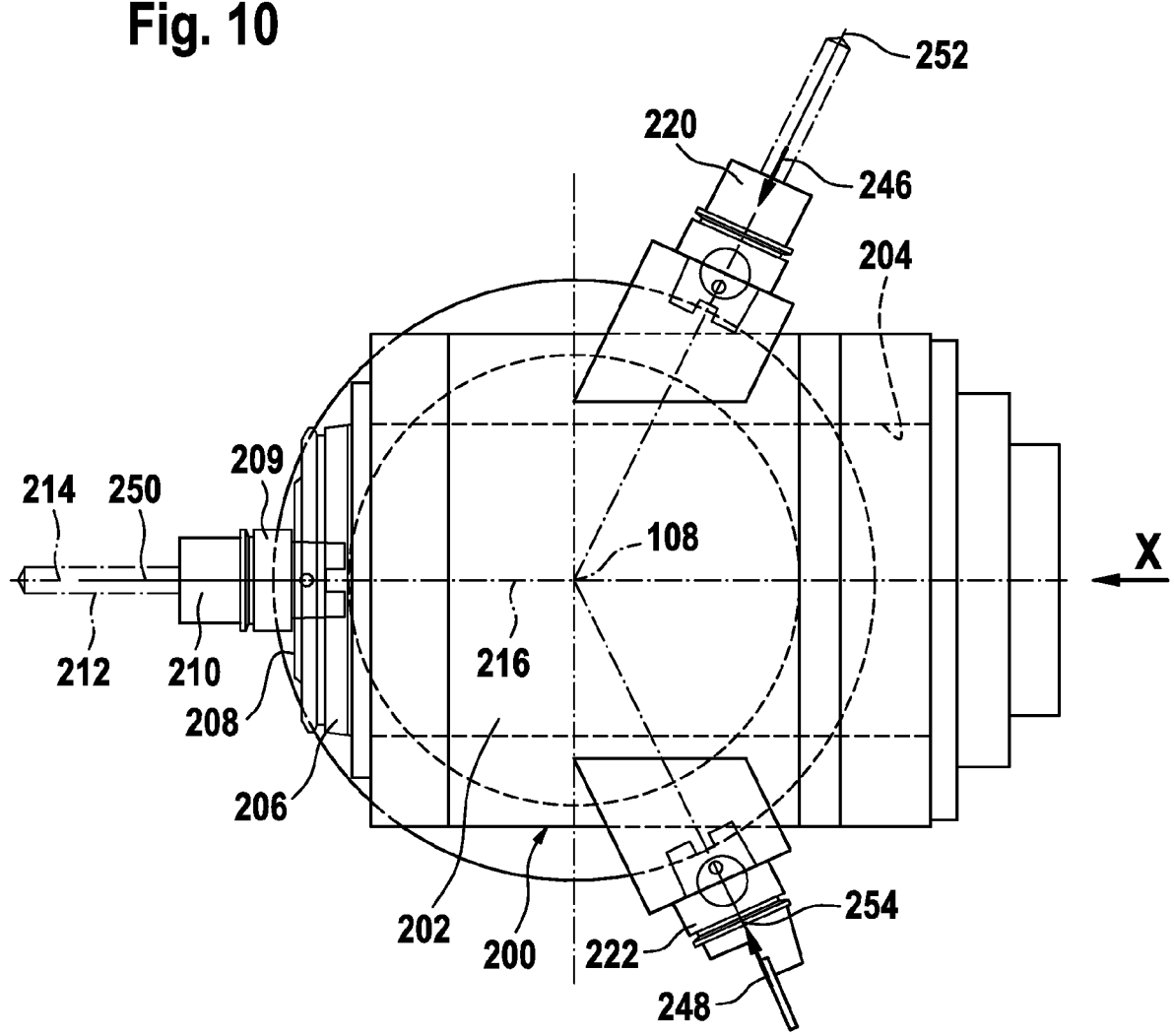
FIG. 10 shows an enlarged plan view similar to FIG. 9 of one of the tool spindles of the fifth exemplary embodiment.

By contrast with the previous exemplary embodiments, the tool carrier 104 is formed as a tool spindle 200, as additionally represented in FIG. 10, which has a tool spindle housing 202, in which there is mounted a spindle motor 204, which drives a spindle shaft 206, into which a tool holder 210 can be inserted into a tool holder receiving means 209 in the region of a front end 208. Consequently, a tool 212, which is held in the tool holder 210 and can be driven in a rotating manner by the spindle shaft 206, is seated in the spindle shaft 206, a tool axis 214 running coaxially in relation to a tool spindle axis 216, which represents the axis of rotation of the spindle shaft 206.

The tool spindle 200 has, for example, a power output of at least 8 kW and reaches rotational speeds greater than 10,000 rpm.

The tool axis 214 corresponds to a tool direction, defined by the advance and/or feed directions in the machining of the workpiece, and lies here in a tool plane 250, which runs through the longitudinal axis 108.

Figure 11:
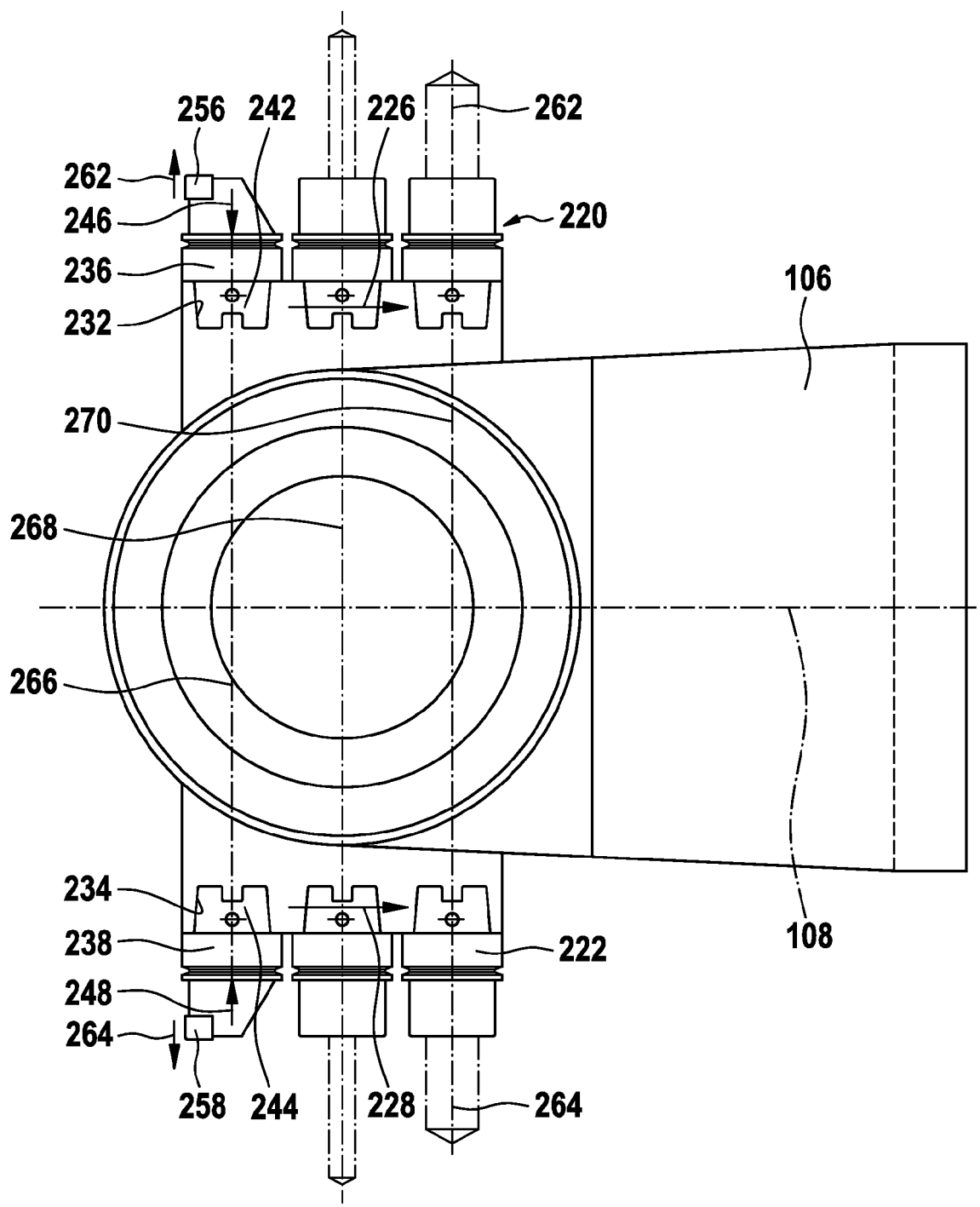
FIG. 11 shows a plan view in the direction of the arrow X in FIG. 10.

As likewise represented in FIGS. 10 and 11, disposed as supplementary tool carriers on the tool spindle housing 202, to be precise on opposite sides of the longitudinal axis 108, are linear tool carriers 220, 222, which have tool holder receiving means 232, 234 that are disposed one after the other in the direction of a row 226, 228 and into which tool holders 236, 238 can be inserted.

The tool holders 236, 238 are all formed such that each insert 242, 244 that can be inserted into the tool holder receiving means 232, 234 of the linear tool carriers 220, 222 can be inserted in a direction of insertion 246, 248, which, as represented in particular in FIG. 10, lie in further tool planes 252, 254, which also run through the longitudinal axis 108, so that the tool planes 250, 252, 254 intersect in the longitudinal axis 108.

Furthermore, the directions of the rows 226, 228 of tool holder receiving means 232, 234 also run parallel to the tool planes 252, 254.

All the tool holders 236, 238 are loaded with tools 256 or 258, which have at least one tool direction 262, 264, which runs parallel to the respective tool plane 252, 254 and is defined by the advance and/or feed directions in the machining of the workpiece, the tool directions 262, 264 preferably lying in the tool planes 252, 254.

Furthermore, the tool directions 262, 264 extend transversely, in particular perpendicularly, to the directions of the rows 226, 228.

The tool planes 252, 254 are preferably not perpendicular to the tool spindle axis 216 and the tool plane 250, but respectively form therewith an included angle of approximately 120°, so that, with respect to the longitudinal axis 108, an angle of 120° exists between the tool plane 250 and the tool plane 252 as well as between the tool plane 250 and the tool plane 254, and, on a side facing away from the tool 212, the tool planes 252, 254 likewise form with one another an included angle of approximately 120°.

Furthermore, the tools disposed one after the other in the respective direction of the row 226, 228 can be brought into use by displacing the tool spindle 200 in the direction of the longitudinal axis 108.

Furthermore, as represented in FIG. 11, the tools 256, 258 respectively disposed on opposite sides of the longitudinal axis 108 lie in alignment planes 266, 268, 270 running perpendicularly to the longitudinal axis 108, so that, depending on the position of the tool spindle 200, the tools 256, 258 that lie in one of the alignment planes 266, 268, 270 can be brought into use on the workpiece, a change of tool being possible just by turning the entire workpiece spindle 200 about the longitudinal axis 108.

Furthermore, the alignment plane 268 is preferably disposed such that not only the directions of advance 262, 264 of the tools 256, 258 of the linear tool carriers 220, 222 lie in it, but so too does the tool axis 214 of the tool 212.

Figure 12:
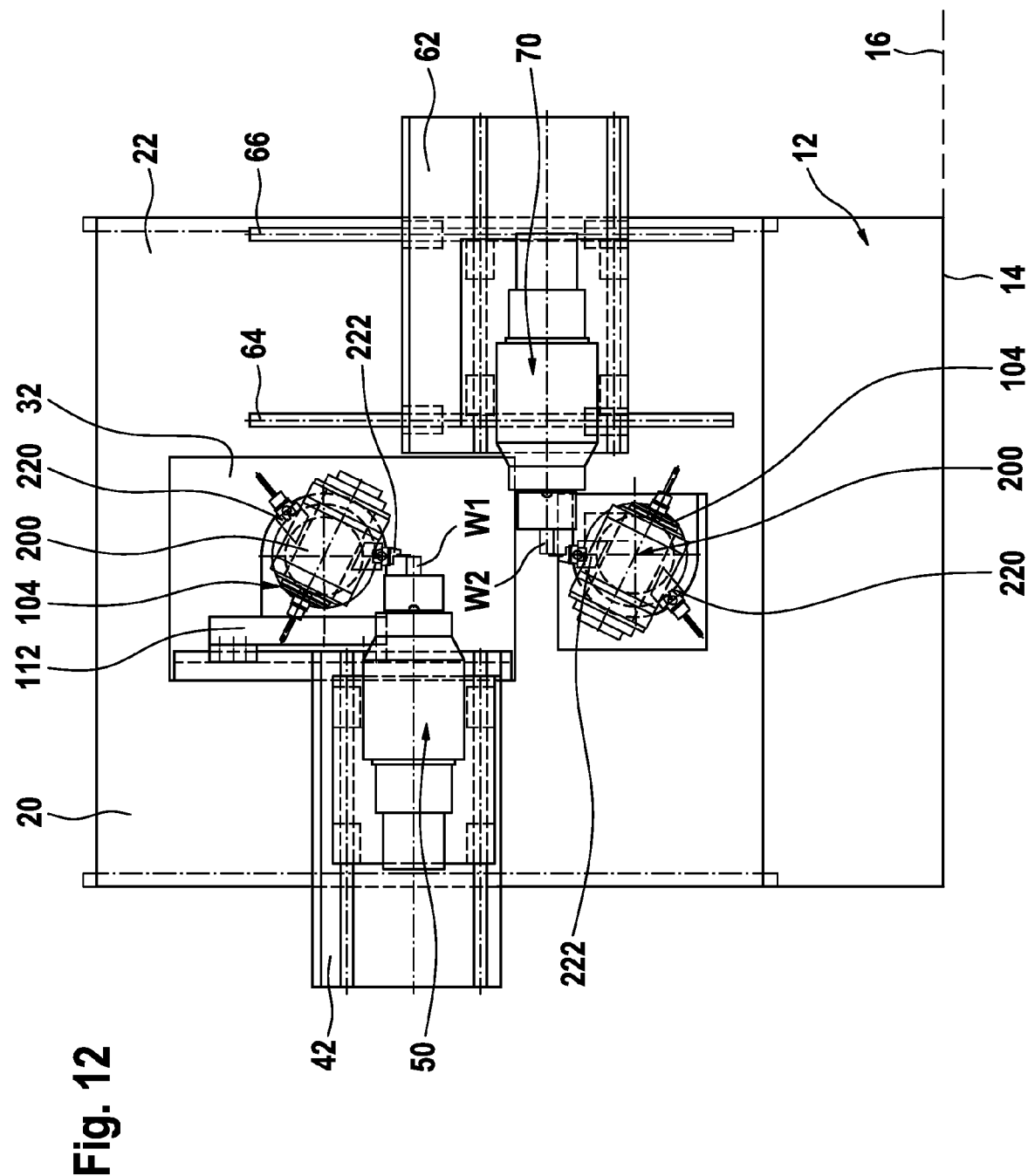
FIG. 12 shows a view similar to FIG. 9 when using tools of the linear tool carriers in a radial direction in relation to the workpiece spindle axis.
Figure 13:
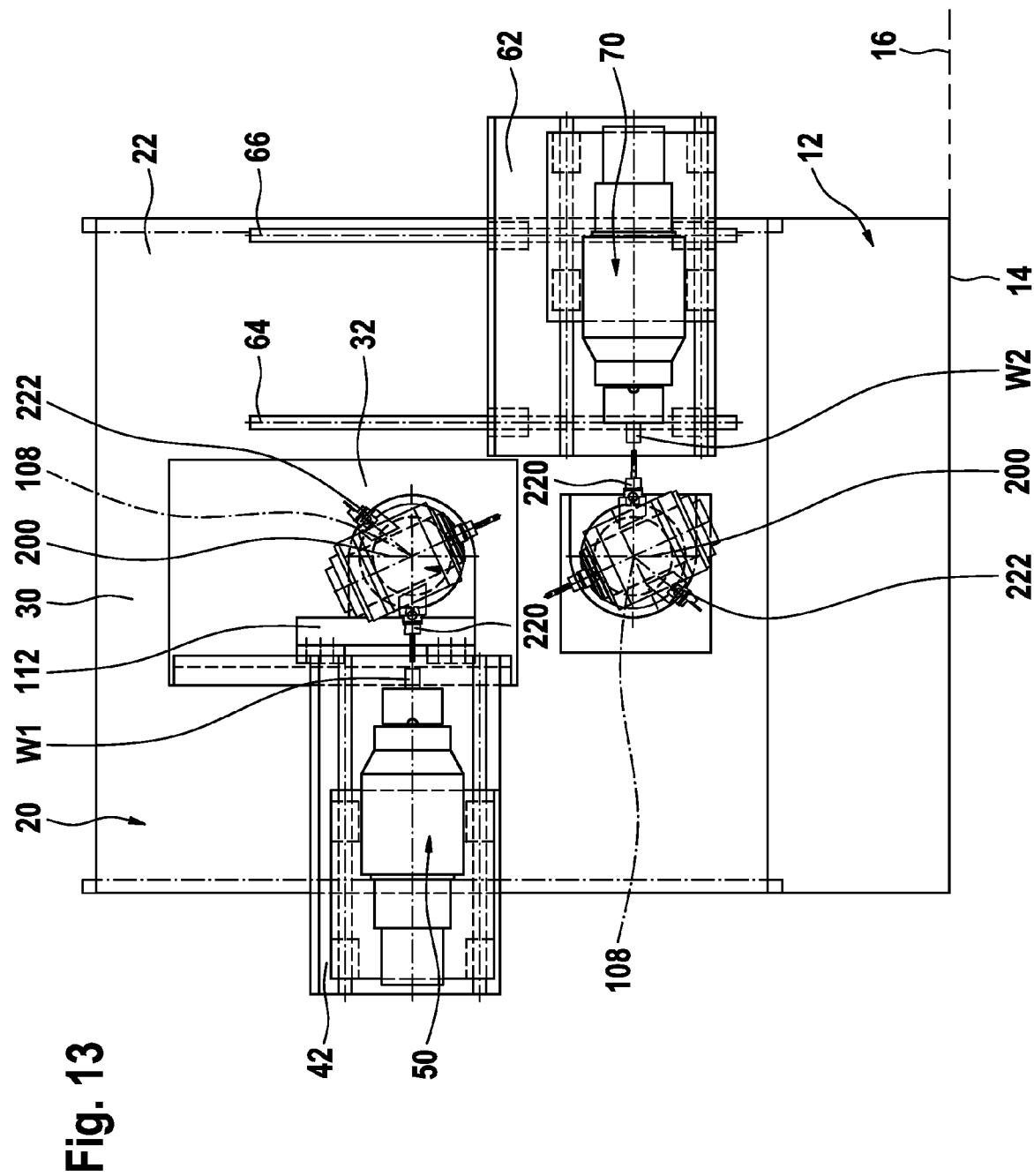
FIG. 13 shows a representation similar to FIG. 9 when using tools of the linear tool carriers parallel to the tool spindle axis.

The changing use of the different tools is represented in FIGS. 12 and 13, the advantage of this solution being that the tools that are not in use on the workpiece are at such an angular distance from one another, with respect to the longitudinal axis 108, that they do not hinder the machining of the workpiece in the respective workpiece spindle unit 50, 70.

Figure 14:
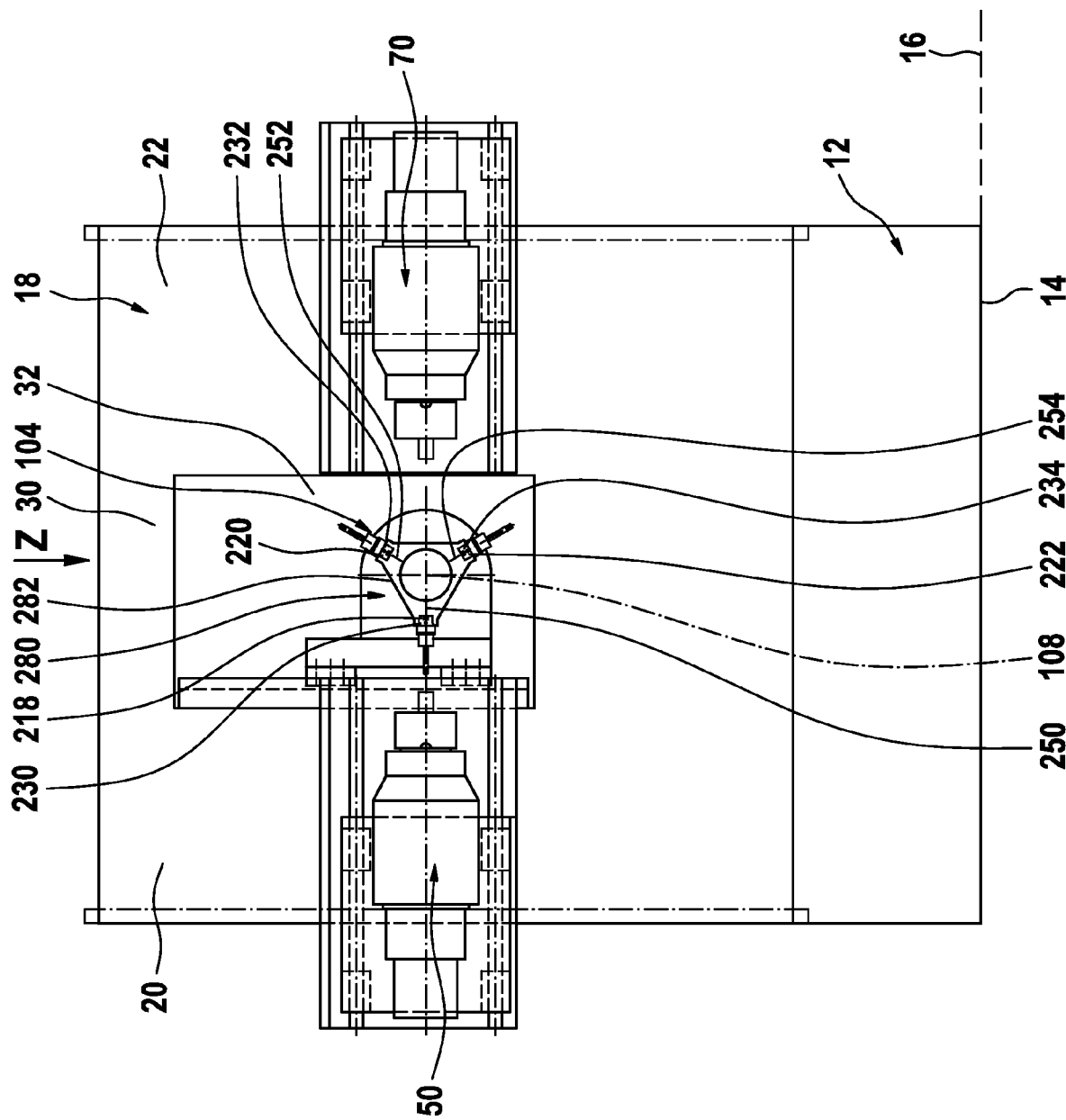
FIG. 14 shows a view similar to FIG. 1 of a sixth exemplary embodiment of a turning center according to the invention.
Figure 15:
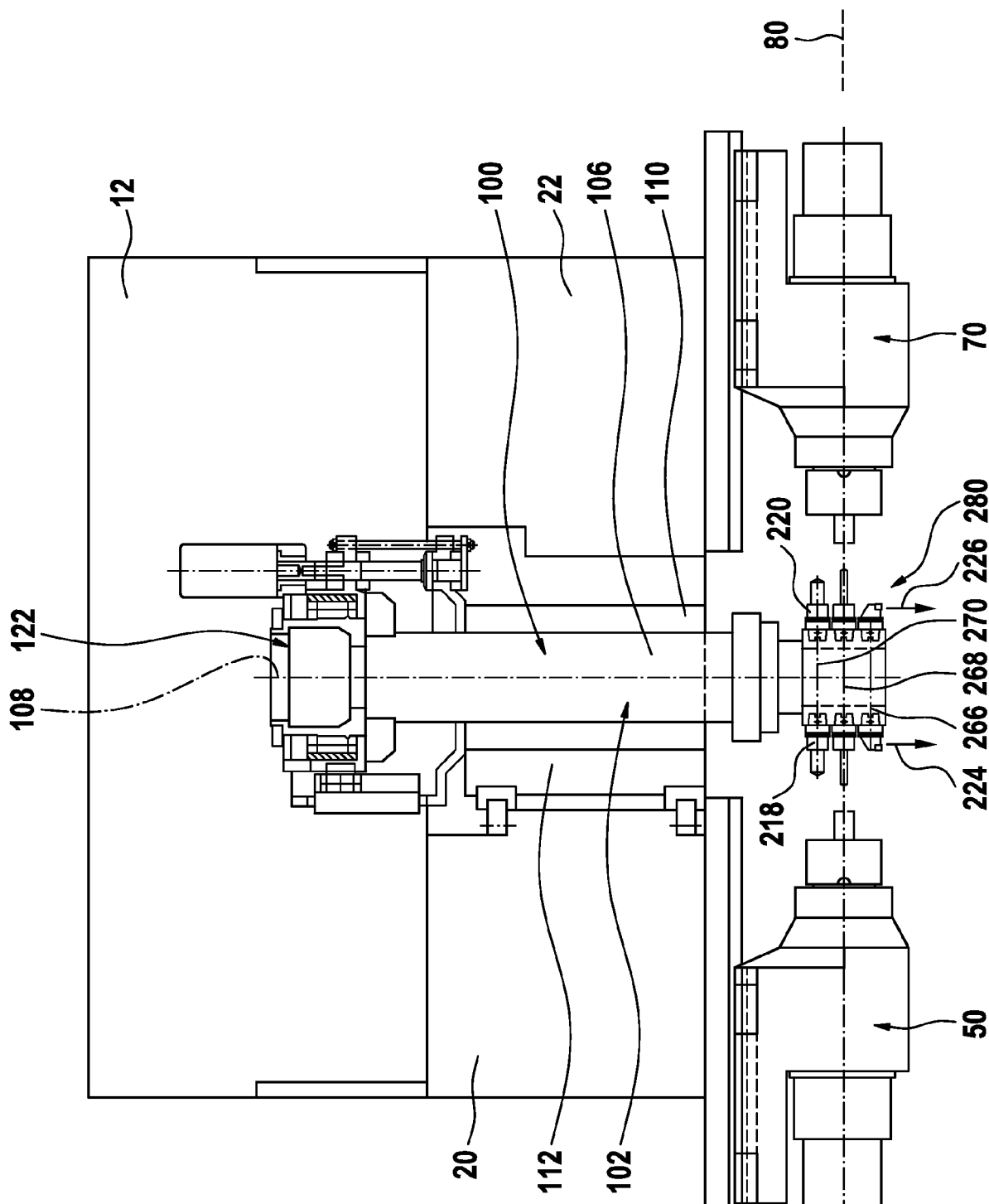
FIG. 15 shows a plan view in the direction of the arrow Z in FIG. 14.

In the case of a sixth exemplary embodiment, represented in FIGS. 14 and 15, those elements that are identical to those of the previous exemplary embodiments are provided with the same reference numerals, so that, with regard to the description of the same, reference can be made to the statements made with respect to the previous exemplary embodiments in their entirety.

In the case of the sixth exemplary embodiment, the tool carrier 104 is formed as a multiple linear tool carrier 280, such that, in a way similar to in the case of the fourth exemplary embodiment, it has three tool planes 250, 252, 254, which all form between them an included angle of 120°, and in which tools are respectively disposed one after the other in the direction of the corresponding row, the tools also in this case lying in successive alignment planes 266, 268, 270.

By contrast with the fourth exemplary embodiment, however, all the tools are, for example, non-driven tools. They are merely used as stationary tools in connection with one of the workpiece spindle units 50, 70.

A change of the respective tool is possible in a simple manner, by a base 282 of the multiple linear tool carrier 280, carrying all the tool holder receiving means, being rotatable about the longitudinal axis 108 and displaceable in the direction of the longitudinal axis 108.

Figure 16:
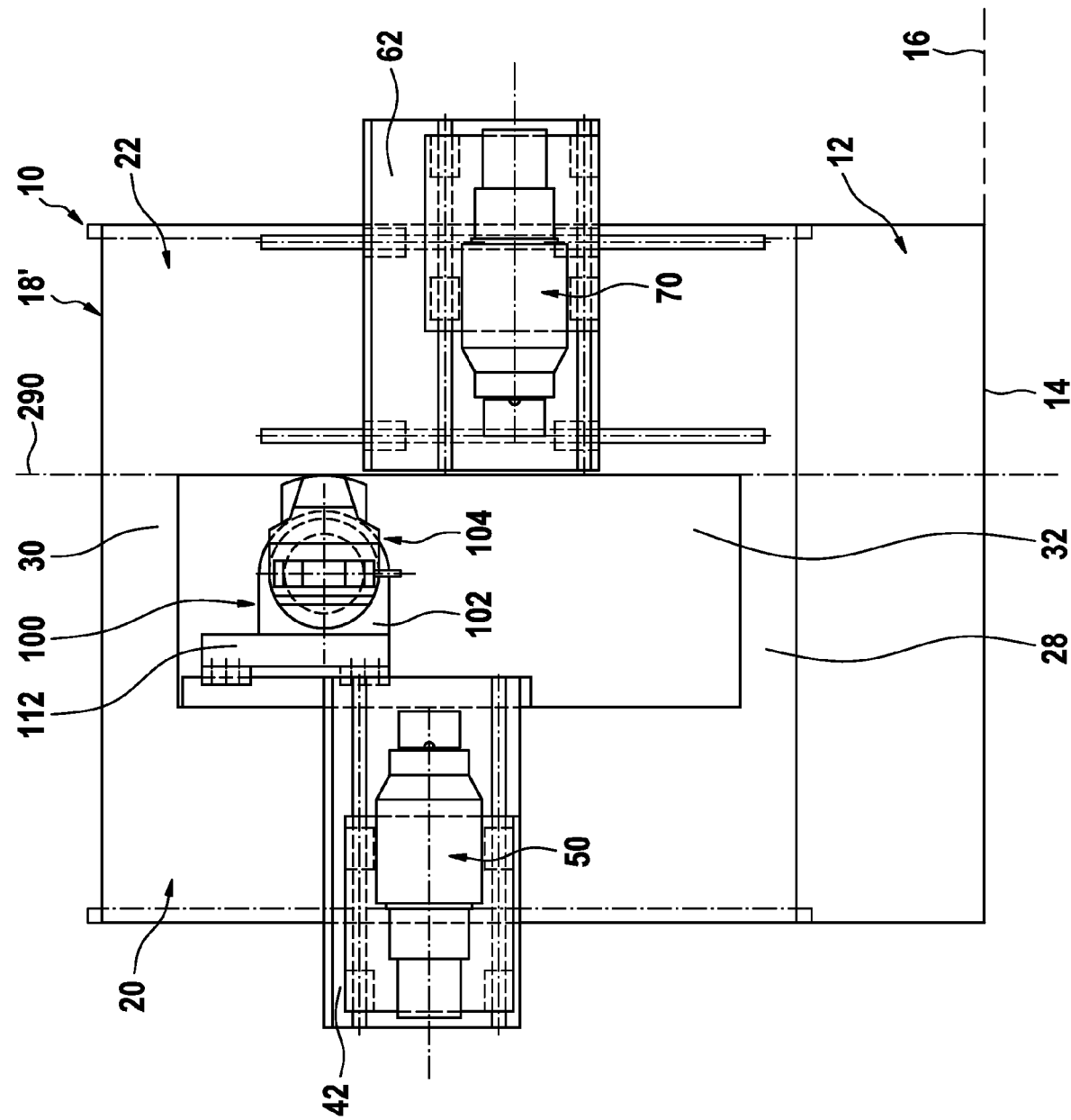
FIG. 16 shows a view similar to FIG. 1 of a seventh exemplary embodiment of a turning center according to the invention.

In the case of a seventh exemplary embodiment, represented in FIG. 16, the machine bed 18' is, for example, made up of two parts. Thus, one part of the machine bed 18' is formed by the column 20 and the cross bracings 28 and 30, and the other part is formed by the column 22, which can be separated from the cross bracings 28, 30 along a separating plane 290, so that the machine bed 18 can be easily produced and transported.

The tool carriers 104 described in the context of the exemplary embodiments according to the invention merely represent examples.

Depending on the machining to be carried out, tool turrets 130, tool spindles 200 and multiple linear tool carriers 280 may be combined with one another within the scope of the present invention.

Instead of the examples of tool carriers 104 described, it is also possible to use other kinds of tool carriers, such as for example grinding units.

The invention claimed is:

1. Turning center comprising
a machine frame,
a first workpiece spindle unit, which is disposed on the machine frame and has a first workpiece spindle that is rotatable about a first workpiece spindle axis,
a second workpiece spindle unit, which is disposed on the machine frame and has a second workpiece spindle that is rotatable about a second workpiece spindle axis,
at least one tool carrier unit, which is disposed on the machine frame and on which at least one tool for machining a workpiece held in the workpiece spindle units is disposed,
and a working space, in which workpieces held in the workpiece spindle units can be machined with the tool,
the machine frame having a machine bed formed by two spaced-apart columns, the first workpiece spindle unit being disposed on a front side of a first of the columns, facing the working space,
the second workpiece spindle unit being disposed on a front side of a second of the columns, facing the working space,
and the at least one tool carrier unit being disposed on a transverse side of one of the columns, facing the respective other column.

2. Turning center according to claim 1, wherein the columns extend with their longitudinal axes transversely to a standing area of the machine frame.

3. Turning center according to claim 1, wherein the columns extend parallel to one another.

4. Turning center according to claim 2, wherein the columns extend substantially perpendicularly to the standing area.

5. Turning center according to claim 1, wherein the columns are of approximately the same length.

6. Turning center according to claim 1, wherein at least one opening is provided between the columns.

7. Turning center according to claim 1, wherein the columns are connected to one another by at least one cross bracing.

8. Turning center according to claim 7, wherein the columns are connected at the ends by at least one cross bracing.

9. Turning center according to claim 8, wherein the at least one cross bracing is formed onto at least one of the columns.

10. Turning center according to claim 1, wherein the machine bed is made up of two parts.

11. Turning center according to claim 10, wherein the machine bed is made up of a first column with at least one crosspiece and a second column.

12. Turning center according to claim 1, wherein the columns are connected to form a yoke-like body.

13. Turning center according to claim 12, wherein the yoke-like body encloses at least one opening.

14. Turning center according to claim 13, wherein the yoke-like body encloses two openings.

15. Turning center according to claim 1, wherein the columns have flat front sides.

16. Turning center according to claim 1, wherein the respective front side runs transversely to the standing area of the machine frame.

17. Turning center according to claim 1, wherein the columns have mutually facing flat transverse sides.

18. Turning center according to claim 17, wherein the first and second transverse sides are disposed on opposite sides of the opening.

19. Turning center according to claim 17, wherein the transverse sides run transversely to a standing area of the machine frame.

20. Turning center according to claim 1, wherein the columns have an approximately rectangular cross-sectional form.

21. Turning center according to claim 1, wherein at least one of the workpiece spindle units is guided movably in relation to the machine bed parallel to the respective front side.

22. Turning center according to claim 21, wherein each of the workpiece spindle units is guided movably in relation to the machine bed parallel to the front side respectively carrying said units.

23. Turning center according to claim 1, wherein at least one of the workpiece spindle units is guided movably in relation to the machine bed parallel to the respective workpiece spindle axis.

24. Turning center according to claim 23, wherein both workpiece spindle units are guided movably in relation to the machine bed parallel to their respective workpiece spindle axis.

25. Turning center according to claim 1, wherein one of the workpiece spindle units is guided movably in relation to the machine bed transversely to the respective workpiece spindle axis.

26. Turning center according to claim 1, wherein both workpiece spindle units are movable with their workpiece spindle axes in a common first geometric spindle guiding plane.

27. Turning center according to claim 1, wherein two tool carrier units are provided.

28. Turning center according to claim 27, wherein each of the two tool carrier units is disposed on a transverse side of one of the columns of the machine bed.

29. Turning center according to claim 27, wherein a first tool carrier unit is provided.

30. Turning center according to claim 27, wherein a second tool carrier unit is provided.

31. Turning center according to claim 30, wherein the first and second tool carrier units are disposed on different columns of the machine bed.

32. Turning center according to claim 29, wherein the first tool carrier unit is associated with the first workpiece spindle unit.

33. Turning center according to claim 29, wherein the first tool carrier unit is disposed on the column carrying the first workpiece spindle unit.

34. Turning center according to claim 30, wherein the second tool carrier unit is associated with the second workpiece spindle unit.

35. Turning center according to claim 30, wherein the second tool carrier unit is disposed on the column carrying the second workpiece spindle unit.

36. Turning center according to claim 1, wherein the at least one tool carrier unit extends into the respective opening.

37. Turning center according to claim 36, wherein the tool carrier unit extends through the respective opening.

38. Turning center according to claim 1, wherein the at least one tool carrier unit has a tool carrier base and a tool carrier.

39. Turning center according to claim 38, wherein the tool carrier base is disposed at least partially in the opening.

40. Turning center according to claim 38, wherein the tool carrier is movable in the working space outside the opening.

* * * * *